United States Patent [19]

Kovalovsky

[11] 4,428,141
[45] Jan. 31, 1984

[54] LINE GUIDE FOR FISHING RODS

[76] Inventor: Oscar Kovalovsky, 11154 Debby St., North Hollywood, Calif. 91606

[21] Appl. No.: 347,718

[22] Filed: Feb. 10, 1982

[51] Int. Cl.³ .............................................. A01K 87/04
[52] U.S. Cl. ................................... 43/24; 242/157 R; 254/411; 254/416
[58] Field of Search ....................... 43/24; 242/157 R; 254/390, 411, 416

[56] References Cited

U.S. PATENT DOCUMENTS

| | | | |
|---|---|---|---|
| 2,878,083 | 3/1959 | O'Brien | 43/24 |
| 2,878,609 | 3/1959 | O'Brien | 43/24 |
| 3,058,255 | 10/1962 | Gorham | 43/24 |
| 3,309,810 | 3/1967 | Hannon | 43/24 |
| 3,354,574 | 11/1967 | Bartoletti | 43/24 |
| 4,070,785 | 1/1978 | Hawk | 43/24 |

FOREIGN PATENT DOCUMENTS

| | | | |
|---|---|---|---|
| 876014 | 5/1953 | Fed. Rep. of Germany | 43/24 |
| 27378 | 4/1955 | Finland | 254/390 |
| 1077940 | 11/1954 | France | 254/390 |
| 432453 | 3/1948 | Italy | 242/157 R |
| 749160 | 5/1956 | United Kingdom | 254/390 |

*Primary Examiner*—Gene P. Crosby
*Attorney, Agent, or Firm*—Roger A. Marrs

[57] ABSTRACT

A guide is disclosed herein through which a fishing line is trained which includes a U-shaped frame or yoke movably supporting a spool roller on ball bearing assemblies between sideplates which is provided with a reduced central portion for movably conducting and guiding the fishing line thereover. The spool roller includes end flanges which are inset into end caps while the ball bearing assemblies are carried on opposite ends of the spool roller. A mounting shaft extends through the spool roller and the end caps detachably mount the spool roller and bearing assemblies to the yoke sideplates via a threaded engagement with the shaft. Detachable mounting members retain the yoke onto the fishing pole via a plurality of thread windings wrapped therearound.

10 Claims, 6 Drawing Figures

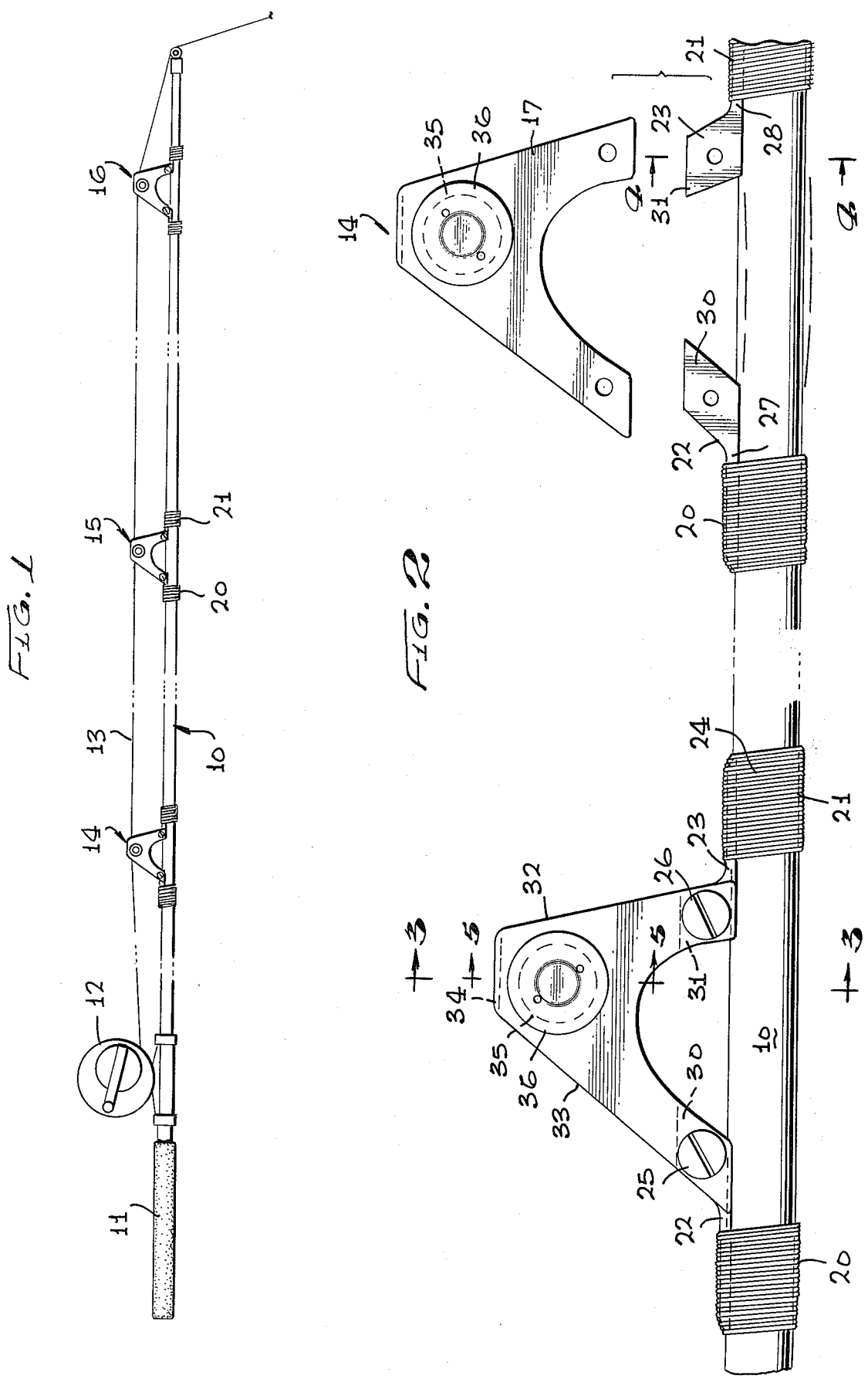

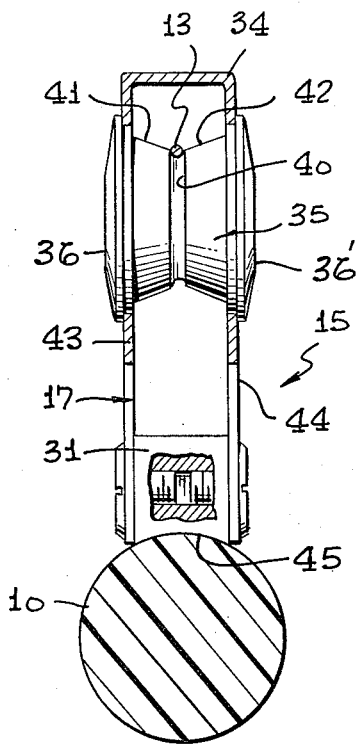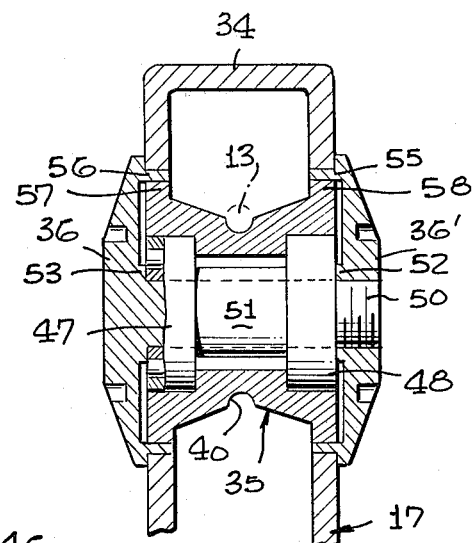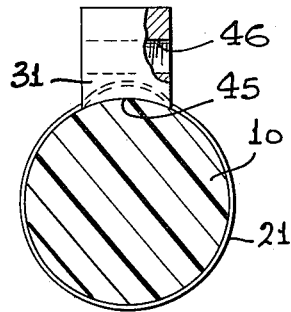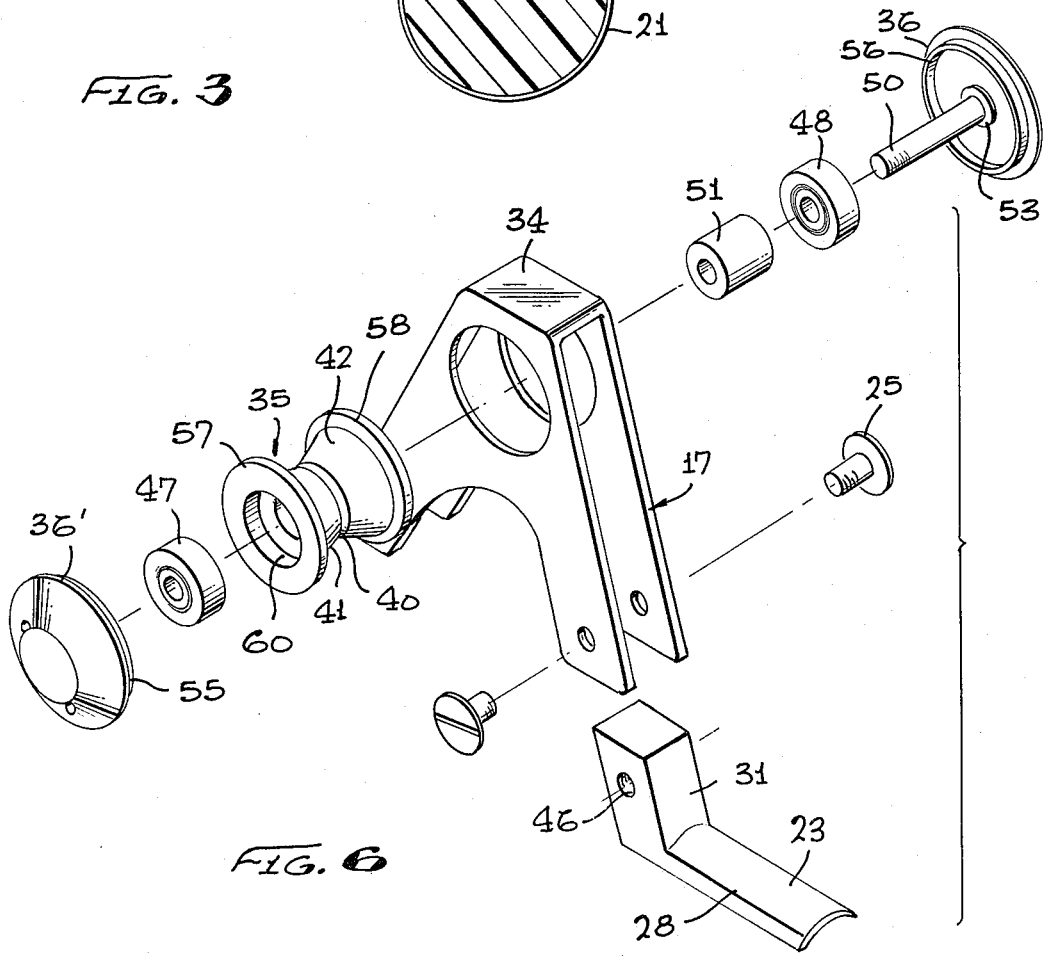

LINE GUIDE FOR FISHING RODS

BACKGROUND OF THE INVENTION

1. Field of the Invention

The present invention relates to guides for fishing line and more particularly, to a novel fishing line guide having a recessed roller and which includes a removable frame which when carried on a fishing pole functions in a manner similar to a hinge so as to prevent undue stress on attachment threaded windings

2. Brief Description of the Prior Art

In the past, it has been the conventional practice to guide fishing line through a series of fixed and spaced apart eyelets that are carried along the length of a fishing pole. During the procedure of catching a fish, the rod is oftentimes bent under the load of the fish on the line which applies undue stress on the threaded windings normally employed to secure each eyelet to the pole. After repeated bendings, the threaded windings generally fatigue and break which causes loss of the eyelet and reduced effectiveness of the fishing pole. Also, conventional eyelets cannot readily be detached from the pole for replacement or repair purposes since the feet on the eyelet are non-flexible, immovable and secured or bound to the rod by the plurality of threaded windings. The salt water environment readily causes the eyelets to rust, fatigue and otherwise deteriorate so that replacement and repair is difficult and time consuming. Also, when it is desired to travel such as by airplane, the fishing pole may be readily disassembled with the eyelets thereon. However, the eyelets must remain on the segments of the fishing pole and cannot be removed for storage in other luggage or equipment bags.

Still further problems and difficulties have been encountered with conventional eyelets which are secured to a fishing pole that stem largely from the fact that during the gaffing of a fish, slack in the fishing line often wraps about the eyelet and is drawn tight which readily results in line breakage or loss of control by the fisherman.

Therefore, it can be seen that a longstanding need has existed to provide a novel guiding means for training fishing line along the length of a fishing rod or pole which will readily move or flex with the pole as it is bent and which may be readily detached therefrom for repair, maintenance or travel purposes and which would not fowl or snag the fishing line itself.

SUMMARY OF THE INVENTION

Accordingly, the above problems and difficulties are obviated by the present invention which provides a novel guide means for accomodating passage of fishing line therethrough which comprises a yoke having opposite side plates separated by a spool roller which is readily mounted on a shaft via ball bearing assemblies. The opposite ends of the spool roller are recessed so as to accomodate mounting of the bearing assemblies therein and end cap means having recesses adapted for receiving the opposite ends of the spool rollers are employed for detachably connecting the spool roller, bearings, shaft and end caps to the sidewalls of the yoke.

A feature resides in the provision of a reduced central area of the spool roller for automatically guiding the fishing line into the center of the rollers and the yoke is angularly related to the fishing pole so that any line loops or snags will automatically ride off of the yoke.

Therefore, it is among the primary objects of the present invention to provide the novel guide means for fishing line which will readily permit the fishing line to run through without snagging on the guide means or without catching or being abraded by entry of the fishing line between a spool roller and the guide frame of the guide means itself.

Still another object of the present invention is to provide a novel guide means adapted to prevent the fishing line from fouling on the frame thereof, or any portion of the guide means, in the event that the fishing line were to double-back during the act of catching a fish.

Another object of the present invention is to provide a novel guide means for a fishing pole which will substantially react as a hinge during flexure of the pole and which will avoid placing undue strain on the thread wrappings used for securing the guide means to the pole while the pole or rod is being subjected to bending stress during a fishing procedure.

Another object of the present invention is to provide a novel guide means for fishing line having a guide frame detachably connected to guide feet so that the guide frame may be readily removed for cleaning, replacement or maintainence purposes.

Still a further object of the present invention is to provide a novel guide means for a fishing line having a guide frame or yoke fastened to guide feet for readily removable of the frame for replacement purposes, at any time, without the necessity of completely refinishing modern-made fishing rods protected with epoxy finishes.

Yet a further object of the present invention is to provide a novel fishing guide line roller carried on ball bearing assemblies designed in a manner to guide or urge the fishing line to "ride" the center of the roller.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of a typical fishing rod incorporating several novel fishing line guides incorporating the present invention;

FIG. 2 is an enlarged side elevational view of the fishing line guide used in the illustration of FIG. 1;

FIG. 3 is a transverse cross-sectional view of the fishing pole and novel guide of the present invention as taken in the direction of arrows 3—3 of FIG. 2;

FIG. 4 is a transverse cross-sectional view of the fishing pole and novel guide taken in the direction of arrows 4—4 of FIG. 2;

FIG. 5 is a transverse cross-sectional view of the novel guide shown in FIG. 2 as taken in the direction of arrows 5—5 thereof; and FIG. 6 is an exploded perspective view of the novel guide means shown in FIGS. 1-5 inclusive.

DESCRIPTION OF THE PREFERRED EMBODIMENT

Referring to FIG. 1, a fishing rod is illustrated by numeral 10 which includes a handle 11 and a fishing reel 12 carried thereon for storing a quantity of fishing line as indicated by numeral 13. The fishing line is directed along the length of the rod 10 through a plurality of fishing line guide means such as represented by numeral 14, 15 and 16. Each of the guide means includes a U-shaped frame or yoke 17 which is carried on a segment of the fishing rod 10 by means of a plurality of thread windings 20 and 21 wrapped about the rod and outwardly extending mounting members 22 and 23 disposed between the plurality of thread winding and the surface of the rod 10. As is the usual practice, a coating of epoxy or other sealing material is placed over the plurality of thread windings and such a coating is broadly identified by numeral 24 over the threaded windings 20.

Each guide means includes not only the frame or yoke 17 but further includes screws 25 and 26 on each side of the frame which serve to detachably connect the frame or yoke to the rod mounts 22 and 23 respectively. Therefore, when it is desired to remove the frame or yoke for service and maintainence purposes or for disassembly in order to transfer the guide to an equipment carrying bag during travel, the screws are removed and the frame or yoke disassembled from the rod mounts 22 and 23 which remain on the rod under their respective windings 20 and 21. Such a separation is shown more clearly in connection with guide means 14 in FIG. 2.

Referring to FIG. 2 in detail, it can be seen that the rod mounts 22 and 23 include elongated foot portions 27 and 28 which terminate in blocks 30 and 31 adapted to be coupled to the legs of the frame or yoke 17 by the screws 25 and 26. Therefore, not only do the screw attachments serve as a means of disconnecting the frame or yoke from the mounting members, but the screw connections serve as hinge points permitting the rod to flex or bend as shown in broken lines in connection with guide means 15 without placing undue stress or strain on the plurality of windings 20 and 21 associated on each end of the guide means. The guide means is not rigidly mounted to the rod since the screw connections between the frame and the mounting members 22 and 23 permit flexing of the rod without resistance such as a rigidly mounted conventional eyelet encounters.

Referring in further detail to FIG. 2, it can be seen that each of the guide means, such as guide means 15, include a yoke or frame 17 having a rear end 32 and a forward end 33 which are sloping in a diverging manner from a central bridge 34 of the frame or yoke. By providing the sloping surfaces or ends, loose fishing line cannot snap or otherwise tangle with the guide means since even a loop of fishing line about the guide means will automatically slide off of the guide means past the central bridge 34. Also, it can be seen that the fishing line 13 is guided over an internal spool roller 35 which is held in position on the frame or yoke 17 by a pair of end caps 36 and 36' of which end cap 36 is showing in FIG. 2 while end cap 36' is on the opposite side of the guide means.

Referring now in detail to FIG. 3, it can be seen that the spool roller 35 includes a reduced central portion defined by an annular groove 40 defined by opposite converging sidewalls 41 and 42. It can also be seen that the frame or yoke 17 includes sideplates 43 and 44 which are arranged in fixed spaced apart relationship and are separated by the central bridge 34. The rod mounting block 31 includes a concave surface 45 which is adapted to correspond to the contour of the cylindrical rod 10. In this manner, additional surface area is provided for support of the guide means. An important feature of the present invention resides in the fact that the guide means is relatively narrow in width and short in length so that flexibility of the rod is not adversely altered. Should the guide means be wide and of longer length, then the rod cannot flex or bend as is required in the procedure of catching fish. Also, it can be seen in FIG. 3 that the fishing line 13 is prevented from being abraded or cut by any possible entry of the line between the spool roller 35 and the sideplates of the frame 17. As will be discussed later, the opposite ends of the spool roller are recessed into cavities provided in the opposing surfaces of the side caps 36 and 36 prime so that by maintaining close tolerance, the thickness of the line cannot be accomodated between the roller and the sideplates. Furthermore, FIG. 3 illustrates that all of the screws and end caps are rounded or sloped so that fouling of the fishing line cannot occur.

Referring now in detail to FIG. 4, it can be seen that the mounting member block 31 is provided with an open-ended passageway 46 which is provided with internal threads for receiving the threads of screws 26. The screws are introduced to the opposite ends of the passageway or bore 46 in order to detachably secure the sideplates of the frame 17 thereto. Not only is the block 31 curved to correspond to the contour of the rod 10, but the foot member 23 is co-extensively contoured as well.

Referring in detail to FIG. 5, it is noted that the opposite ends of spool roller 35 are provided with cavities for receiving and mounting bearing assemblies 47 and 48 respectively. Each of the bearing assemblies includes an inner and outer race separated by roll bearings and the outer races of each bearing assembly is fitted into engagement with the opposite ends of the spool roller 35 while the inner races of each bearing assembly is snugly fit over an elongated shaft 50 carried on the end cap 36. The extreme end of the shaft 50 is in threaded engagement with the bore of end cap 36 prime. A spacer 51 bears at its opposite ends against the inner races of the bearing assemblies 47 and 48 so that when the end cap 36 is tightened, an annular shoulder 52 on the end cap 36 prime forcibly urges the inner races and the spacer 51 together against a similar annular flange 53 carried on the end cap 36.

It can also be seen that the end caps 36 and 36 prime include recesses defined by annular shoulders 55 and 56 which define cavities occupied by side flanges 57 and 58 carried on the opposite ends of the spool roller 35. It is the occupation of the end flanges 57 and 58 within these cavities defined by the shoulders 55 and 56 which prevent abrading or cutting of the fishing line between the ends of the spool roller and the sideplates. Therefore, by recessing the bearing assemblies within the spool roller and by recessing the opposite ends of the spool roller into the end cap, a narrow construction is provided which eliminates fouling of the fishing line.

In view of the foregoing, it can be seen that the novel guide means of the present invention provides a fishing line guide along the length of a fishing rod 10 wherein any thrust forces encountered by the guide are taken up by the inner shoulders 52 and 53 of the end cap 36 and 36 prime. The shoulders of the respective caps fit into and against the inner race of bearings 47 and 48 so that no lateral movement of the spool roller 35 is permitted. The recesses of the spool roller on the end of each roller engages with the outer race of each bearing to prevent lateral or transverse movement of the spool thereon. A bearing recess is more clearly illustrated in FIG. 6 by numeral 60 associated with one end of the spool roller 35.

Although substantial tension may be placed on the fishing line due to drag on the reel, such as when a fish is gaffed, no slack or looping of the line will snag on the frame or yoke since the forward and rearward surfaces 32 and 33 slope towards the common bridge 34. The front edges 33 of the respective sideplates of the frame are more sloped than the rear edges 32 in order to provide a narrow or shorter length of the base than can otherwise be provided. If the frame base is too wide or long, adverse affects during bending are encountered because of the multiplicity of line guides employed along the length of the rod.

The frame or yoke of each guide means may be readily removed by disassembly of the screws 25 and 26 associated with each side of the frame. The frame or yoke may then be lifted from the attachment box 31 on each of the mounting members 22 and 23. Therefore, windings 20 and 21 including the epoxy coating are not removed or cut in order to permit repair, replacement or removal of the frame or yoke. The mounting member or anchor feet are arculate or notched at numeral 45 so as to fit the curvature of the rod and are as wide as practical to provide support. It has been found in actual practice that employing conventional line guide eyelets, the bending of the rod only a few thousandths of an inch is enough to break the epoxy and the thread wrappings. However, because of the attachment between the frame and the pair of support mounts, movement is permitted during rod bending so that strain is not unduly placed on the epoxy coating or the wrappings beneath. The connection provided by the screws 25 and 26 on each side of the frame provides a yieldable resistance between the moving parts.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A fishing line guide comprising:
   a yoke having spaced apart sideplates connected at one end by a bridge;
   a spool roller having a reduced central or mid-section;
   a pair of end caps separated by said spool roller and said end caps coupled together by a fixed shaft;
   bearing means movably mounting said spool roller on said shaft;
   said spool roller includes recesses provided at its opposite ends for seating said bearing means so that the ends of said spool roller and said bearing means are co-extensive; and
   a pair of mounting members pivotally carried in spaced apart relationship on opposite ends of said yoke so that said yoke can flex with respect to said mounting members.

2. The invention as defined in claim 1 including:
   fastener means removably coupling said yoke to said mounting members whereby said yoke is detachably carried thereon.

3. The invention as defined in claim 2 wherein:
   each of said mounting members includes an elongated foot having a mounting blocking integrally formed on one end for removably receiving said fastener means.

4. The invention as defined in claim 3 wherein:
   said mounting block and said elongated foot include a co-extensive arcuate undersurface.

5. The invention as defined in claim 1 wherein:
   said bearing means includes a pair of bearing in spaced apart relationship;
   each of said bearings includes an inner race and an outer race; and
   an elongated spacer carried on said shaft having its opposite ends in load bearing relationship with said inner races of each of said bearings.

6. The invention as defined in claim 5 wherein:
   each of said end caps include a circular inner shoulder projecting towards said spool roller in load bearing relationship with the side of said inner race opposite to the side bearing against said spacer.

7. The invention as defined in claim 6 wherein:
   each of said end caps includes an outer circular shoulder co-axial with said inner shoulder; and
   said outer shoulders of each end cap defining a cavity occupied by the opposite ends of said spool roller.

8. The invention as defined in claim 7 wherein:
   said spool roller includes circular flanges carried on the extreme opposite ends thereof encircled by said outer shoulder of each of said end caps respectively.

9. The invention as defined in claim 8 wherein:
   said spool roller includes a circular groove about its mid-section and conical surface section's sloping away from said circular groove in a diverging manner to terminate at said respective end flanges.

10. The invention as defined in claim 9 including:
    said mounting members being removably attached to opposite ends of said yoke; and
    connection means movably coupling said mounting members to said yoke whereby said yoke moves with respect to said mounting members.

* * * * *